United States Patent Office 2,808,227
Patented Oct. 1, 1957

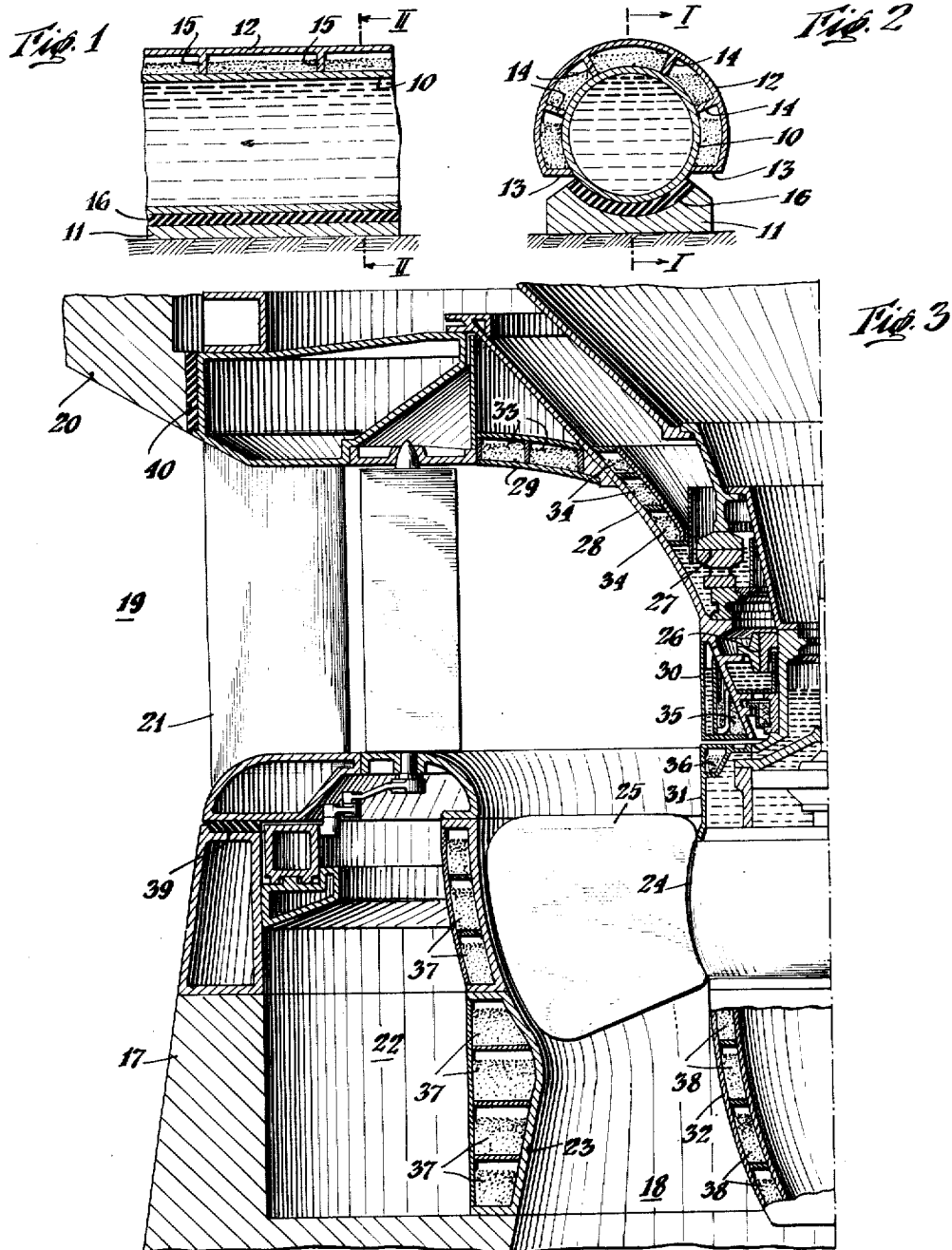

2,808,227

MEANS FOR ABSORBING VIBRATIONS

Pierre François Danel, Grenoble, France, assignor to Etablissements Neyrpic, Grenoble, France, a corporation of France Application June 10, 1953, Serial No. 360,793

Claims priority, application France September 12, 1952

7 Claims. (Cl. 253—101)

This invention relates to constructions subjected to vibration, more particularly vibrations due to or occurring concomitantly with hydraulic flow.

In heavy constructions, notably hydraulic constructions, the walls or other members of the machine or those which serve to guide a fluid are subjected to vibration due to the rotation of the rotatable member of the machine or due to irregular flow of the fluid or to the combination of these two causes. Such vibrations among other disadvantages are harmful to the stability of such walls and members and subject the bearings of the rotatable parts to very severe conditions of operation.

The present invention has for an object means for absorbing the vibrations of a wall or other member for avoiding these disadvantages.

According to the invention, within an envelope carried upon the wall or member a slack, unpacked mass of particular or granulated material is enclosed. Because of such disposition of the mass of granular material vibrations transmitted thereto are progressively deadened by the friction between the neighboring grains of this mass which are moved under the vibrations received thereby. To this end the thickness or depth of the mass in the direction perpendicular to the wall or members subjected to vibration is made sufficient so that a large number of the particles which are in contact with each other will interfere with each other in this movement and thereby absorb the energy transmitted by the wall or member due to vibration.

According to another characteristic of the invention a granulated mass in contact with a wall subjected to vibration preferably is enclosed between this wall and a counter wall spaced therefrom and extending generally parallel thereto. This space is divided into compartments formed by partitions spaced apart in this space and extending thereacross connecting the two walls. The granulated mass is thus prevented from becoming subdivided and disposed in the nodes of vibration developed by the vibrating wall which would interfere with efficient action. The mass of particulate material, being thus divided into small portions, is prevented from flowing and, therefore, moving from its desired position and leaving bare portions of the vibrating wall.

Embodiments of the invention are described by way of example in the description to follow taken in connection with the drawings in which:

Fig. 1 is a longitudinal section on line I—I of Fig. 2 of a conduit embodying the invention.

Fig. 2 is a cross section on line II—II of the conduit of Fig. 1.

Fig. 3 shows in partial vertical section an embodiment of the invention in a vertical turbo-alternator unit of the Kaplan type.

In the embodiment shown in Figs. 1 and 2 a fluid, for example, a liquid under pressure, flows in the direction of the arrow in the conduit 10 mounted on a support 11.

The flow of a fluid in a conduit such as the conduit 10 in practice is never strictly regular and symmetrical but on the contrary develops eddies, turbulence and other parasitic phenomena produced by the irregularities of the wall, changes in direction, etc. These phenomena have the effect of causing the wall of the conduit 10 to vibrate and such vibrations not only are sometimes translated into considerable noise, but, what is more serious, develop the risk after a time of disturbing the support 11 of the conduit 10, especially when large masses of liquid are involved.

To reduce or even eliminate these vibrations of the conduit 10 the invention provides for suppressing them at the point where they originate. To this end a counter wall 12 is disposed in spaced relation to and concentric with the wall of the conduit 10. The counter wall 12 extends about the conduit 10 to points adjacent the support 11, as shown in Fig. 2, and the annular space between the walls 10 and 12 is closed at its extremities adjacent the support 11 by walls 13 fixed to the cylindrical walls. The walls 10 and 12 and the end walls 13 form an envelope or caisson. The annular space of this envelope is divided by partition walls 14 spaced circumferentially about the conduit 10 and extending longitudinally of the conduit and also by partition walls 15 extending circumferentially about the conduit 10 between the walls 10 and 12, the partitions 15 being spaced along the conduit and cooperating with the spaced partitions 14 to form a plurality of compartments subdividing the annular space.

Each compartment of the envelope contains loose, uncompacted granulated material, the grains being relatively fine but being quite distinct particles. Preferably this material is hard so as not to produce powder by being friable. It is preferably also heavy so as to be more efficacious in absorbing the vibrations. Experience shows that satisfactory results may be obtained with chromite, sand or fine gravel but any other appropriate material may be utilized.

In such a mass of unpacked granular material disposed in contact with the walls of each compartment of the envelope subjected to vibrations, movement of the particles takes place and the sum of the contacts between each particle and the adjacent particles is effective to absorb the energy of the vibrations.

It is to be noted that the subdivision of the space by means of the partitions 14 and 15 avoids the collection of the material at the nodes of vibration. Moreover, the material is maintained in small separated masses without running the risk of pouring or flowing and causing portions of the surfaces to become uncovered by the granules. To this end the partitions 14 and 15 are joined to the walls 10 and 12 so as to confine the respective masses of the granules to the respective compartments.

Because of this construction the energy of vibration which is transmitted from the conduit to the support is greatly reduced. A pad of flexible and elastic material 16, moreover, is disposed between the conduit 10 and support 11 to absorb any remaining vibration, so that this support receives practically no vibration.

In place of a fixed wall, such as that of the conduit 10, in many industrial construction fluids act on movable elements, such as the rotatable members of machines, turbines, pumps, etc. These rotatable members are much more inclined than a fixed wall to induce and to transmit vibrations. These vibrations tend to be produced even when the flow of the fluid is favorable and in addition to the undesirable vibration of the support, as in the case of a fixed wall, these vibrations are translated in the case of a rotating machine into accelerated wear of the bearings and abutments.

In the embodiment which is about to be described in connection with Fig. 3 the device of the invention is embodied in a machine having a rotatable element cooperating with a flowing fluid. The machine shown by way of example in Fig. 3 is a vertical turbo-alternator unit of the Kaplan type.

The foundation of the unit is shown at 17. At the interior of this foundation is disposed the draft tube 18.

The distributor chamber 19 extends about the foundation 17 and is defined by the masonry 20. Between the distributor chamber 19 and the conduit 18 is disposed a distributor casing generally designated by the reference numeral 21 which is supported on the foundation 17. The foundation 17 is of the type described in the application for patent filed in France September 4, 1952 for Improvements in Hydro-Electric Units, corresponding to United States application of Pierre F. Danel, Severin X. Casacci and Paul Jarrian, Serial No. 383,814, filed September 4, 1953 and provides an annular gallery 22 extending about the draft tube 18, a waist 23 separating the gallery 22 from the conduit 18 and forming the wall of this conduit being supported on the floor of the gallery.

The rotatable element of the unit formed by the turbine runner 24 having blades 25, the rotor (not shown) of the alternator and the connecting members is guided in bearings, such as the bearing 26, and is supported by an abutment bearing 27. This abutment bearing is mounted on a fixed truncated annular member 28 diverging upwardly and hung at its upward extremity on the distributor casing 21 which transmits the weight of member 28 and the parts supported thereby and the axial thrust of the unit to the foundation 17. An annular guide member 29 extends between the distributor casing 21 and the support 28. Two coaxial cylindrical guide elements 30, 31, one a prolongation of the other, respectively are fixed upon the support 28 and the turbine runner 24.

The water at the outlet from the distribution chamber 19, after having passed the distributor casing 21, moves along the guide 29, the support 28, the guide elements 30, 31 and engages the blades 25 of the turbine runner 24. It then moves through the waist 23 and along the turbine runner cap 32. Even with a distribution chamber 19 carefully designed for regular distribution of the water at the right of the distributor casing 21, the desired regularity is never strictly obtained and vibrations thereby are developed in the walls and members 29, 28, 30, 31, 23, 24, 32 in contact with which the water flows.

Of the several walls and members the walls 29, 28, 30, 23 are fixed. The walls and members 31, 24, 32 are movable and the vibrations developed therein by the moving water and aided by the rotation of the turbine are transmitted to the bearing 26 and the abutment bearing 27 as well as to the masonry 17 and 20. The invention is applicable to fixed walls and members as well as to movable walls and members.

In a similar manner to that described in connection with Figs. 1 and 2, in the embodiment of Fig. 3 granular material is enclosed in compartments disposed along each wall concerned. Such compartments are shown at 33, 34, 35, 36, 37 and 38 respectively for the walls 29, 28, 30, 31, 23, and 32. It is to be noted that the spaces at the interior side of the walls 28, 30, 31 may at least partially be occupied by oil, for example, for the lubrication of the abutment bearing 27 and of the bearing 26 or the oil for controlling a servomotor for moving the blades of the turbine in accordance with the device described in the application for patent in France on September 9, 1952 for "Apparatus for Storing, Circulating, and Cooling of Oil in Turbines of the Kaplan Type" corresponding to the United States application of Pierre F. Danel, Serial No. 379,247, filed September 9, 1953. The compartments containing the granulated material in accordance with the invention are provided along only part of these walls in such a manner as to leave sufficient space for the oil.

In the device which has been described vibrations are greatly deadened which averts all danger of excessive wear in the bearings 26 and in the abutment bearings 27 due to this cause. All risk of shaking or disturbance of the masonry parts 17 and 20 likewise is avoided. Rubber pads 39 and 40 may be disposed also between the masonry and the distributor casing 21 in such a manner as to absorb any residue of the vibration which for the most part has been deadened by the particulate material in the compartments which otherwise would reach the masonry structure.

It will be understood that the invention is not limited to the embodiments described and shown in the drawings but includes all variations which embody the features of the invention above described.

I claim:

1. In a turbine installation, a runner, means for supporting said runner for rotation on the axis, a wall defining a part of a hydraulic fluid flow passage disposed adjacent said runner, a second wall located exteriorly to said first wall with respect to the axis of rotation and oppositely to said first wall, said walls conveying a hydraulic fluid through said passage and directing said fluid to flow into and away from rotation producing engagement with said runner, means providing walls extending about a plurality of compartments disposed adjacent each other and distributed over said fluid flow passage walls at the opposite faces of said passage walls from said fluid flow passage, and uncompacted masses of solid particulate material confined within and incompletely filling the respective compartments in vibration-receiving engagement with said compartment walls, said means providing said compartment walls being disposed in vibration transmitting engagement with said passage walls for transmitting to said masses of particulate material vibrations of said passage walls so as to be absorbed by said particulate material.

2. In a turbine installation the structure as defined in claim 1 in which said particulate material is sand.

3. In a turbine installation the structure as defined in claim 1 in which said particulate material comprises granules of chromite.

4. In a turbine installation the structure as defined in claim 1 which comprises a support supporting said fluid flow passage walls, and resilient means disposed between said support and said walls for absorbing residual vibrations of said walls transmitted toward said support.

5. In a hydraulic turbine installation, the structure as defined in claim 1 in which said passage walls comprise at least a part of a wall defining the draft tube which carries the hydraulic fluid from said turbine runner.

6. In a hydraulic turbine installation, the structure as defined in claim 1 in which said passage walls comprise at least a part of a wall of said runner of said turbine disposed in the draft tube of said turbine.

7. In a turbine installation, a runner, means for supporting said runner for rotation on the axis, a wall defining a part of a hydraulic fluid flow passage disposed adjacent said runner, a second wall located exteriorly to said first wall with respect to the axis of rotation and oppositely to said first wall, said walls conveying a hydraulic fluid through said passage and directing said fluid to flow into and away from rotation producing engagement with said runner, said means for supporting said runner being supported on said first wall, means providing walls extending about a plurality of compartments disposed adjacent each other and distributed over said fluid flow passage walls at the opposite faces of said passage walls from said fluid flow passage, and uncompassed masses of solid particulate material confined within and incompletely filling the respective compartments in vibration-receiving engagement with said compartment walls, said means providing said compartment walls being disposed in vibration transmitting engagement with said passage walls for transmitting to said masses of particulate material vibrations of said passage walls so as to be absorbed by said particulate material.

References Cited in the file of this patent

UNITED STATES PATENTS

| | | |
|---|---|---|
| 1,137,948 | Buehle | May 4, 1915 |
| 1,622,827 | Hanson | Mar. 29, 1927 |
| 1,726,045 | Sneed | Aug. 27, 1929 |
| 1,894,276 | Lampton | Jan. 17, 1933 |
| 1,962,380 | Biggs | June 12, 1934 |
| 2,006,340 | Baumann | July 2, 1935 |
| 2,041,767 | Jack | May 26, 1936 |
| 2,054,142 | Sharp | Sept. 15, 1936 |
| 2,077,883 | Hand | Apr. 20, 1937 |
| 2,151,280 | Rouy | Mar. 21, 1939 |
| 2,417,347 | Brown | Mar. 11, 1947 |
| 2,469,167 | Little | May 3, 1949 |
| 2,541,159 | Geiger | Feb. 13, 1951 |

UNITED STATES PATENT OFFICE

CERTIFICATE OF CORRECTION

Patent No. 2,808,227 October 1, 1957

Pierre Francois Danel

It is hereby certified that error appears in the printed specification of the above numbered patent requiring correction and that the said Letters Patent should read as corrected below.

Column 1, line 32, for "particular" read --particulate--; column 2, line 61, for "construction" read --constructions--; column 4, lines 69 and 70, for "uncompassed" read --uncompacted--.

Signed and sealed this 17th day of December 1957.

(SEAL)
Attest:
KARL H. AXLINE
Attesting Officer

ROBERT C. WATSON
Commissioner of Patents